US008190661B2

(12) United States Patent
Bloesch

(10) Patent No.: US 8,190,661 B2
(45) Date of Patent: May 29, 2012

(54) USING VIRTUAL REPOSITORY ITEMS FOR CUSTOMIZED DISPLAY

(75) Inventor: Anthony Christopher Bloesch, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 1251 days.

(21) Appl. No.: 11/626,815

(22) Filed: Jan. 24, 2007

(65) Prior Publication Data

US 2008/0177692 A1   Jul. 24, 2008

(51) Int. Cl.
G06F 17/30 (2006.01)
(52) U.S. Cl. ........ 707/831; 715/273; 707/821; 707/822; 707/828
(58) Field of Classification Search .................. 715/273; 707/831

See application file for complete search history.

(56) References Cited

U.S. PATENT DOCUMENTS

| | | |
|---|---|---|
| 5,581,755 A | 12/1996 | Koerber |
| 5,737,591 A | 4/1998 | Kaplan et al. |
| 5,878,432 A | 3/1999 | Misheski et al. |
| 5,950,209 A | 9/1999 | Carrier |
| 5,978,811 A | 11/1999 | Smiley |
| 6,038,393 A | 3/2000 | Lyengar |
| 6,167,405 A | 12/2000 | Rosensteel et al. |
| 6,173,439 B1 | 1/2001 | Carlson et al. |
| 6,240,416 B1 | 5/2001 | Immon et al. |
| 6,381,743 B1 | 4/2002 | Mutschler, III |
| 6,460,052 B1 | 10/2002 | Thomas |
| 6,532,588 B1 | 3/2003 | Porter |
| 6,578,037 B1 | 6/2003 | Wong et al. |
| 6,598,219 B1 | 7/2003 | Lau |
| 6,662,188 B1 | 12/2003 | Rasmussen |
| 6,681,382 B1 | 1/2004 | Kakumani |
| 6,745,332 B1 | 6/2004 | Wong et al. |
| 6,874,146 B1 | 3/2005 | Lyengar |
| 6,920,458 B1 | 7/2005 | Chu et al. |
| 6,959,326 B1 | 10/2005 | Day |
| 6,978,281 B1 | 12/2005 | Kruy |
| 6,996,558 B2 | 2/2006 | Dettinger et al. |
| 7,028,057 B1 | 4/2006 | Vasudevan |
| 7,076,496 B1 | 7/2006 | Ruizandrade |
| 7,120,898 B2 | 10/2006 | Grover et al. |

(Continued)

OTHER PUBLICATIONS

A Framework for Expressing the Relationships Between Multiple Views in Requirements Specification, Bashar Nuseibeh, Jeff Kramer, Anthony Finkelstein, Oct. 1994 http://www.cs.ucl.ac.uk/staff/A.Finkelstein/papers/tse94.icse.pdf (20 pages).

(Continued)

*Primary Examiner* — Laurie Ries
*Assistant Examiner* — Zaida Marrero
(74) *Attorney, Agent, or Firm* — Workman Nydegger

(57) ABSTRACT

In one embodiment, a computer system performs a method for providing repository item information from one or more different perspectives using virtual repository items within a customizable presentation scheme. A computer system accesses a user-defined presentation scheme that describes a manner in which repository items are to be presented. The computer system generates virtual repository items for actual repository items based on the user-defined presentation scheme. The virtual repository items are generated for presentation along with their actual repository items. The computer system maps the virtual repository items to different virtualized sets of repository items according to the user-defined presentation scheme. The virtualized sets comprise at least one of actual repository items and virtual repository items. The computer system presents the virtualized sets of repository items in one or more different perspectives within the user-defined presentation scheme.

16 Claims, 3 Drawing Sheets

U.S. PATENT DOCUMENTS

| | | |
|---|---|---|
| 7,133,871 B2 | 11/2006 | Sluiman |
| 7,143,091 B2 | 11/2006 | Charnock |
| 7,146,355 B2 | 12/2006 | Chu-Carroll |
| 7,146,606 B2 | 12/2006 | Mitchell |
| 7,155,703 B2 | 12/2006 | Meijer et al. |
| 7,168,063 B2 | 1/2007 | Meijer |
| 7,213,037 B2 | 5/2007 | Rangadass |
| 7,349,913 B2 | 3/2008 | Clark et al. |
| 7,350,172 B1 | 3/2008 | Koh |
| 7,383,255 B2 | 6/2008 | Desai |
| 7,558,781 B2 | 7/2009 | Probst |
| 7,783,763 B2 | 8/2010 | Tuel |
| 2002/0087665 A1 | 7/2002 | Marshall et al. |
| 2002/0184194 A1 | 12/2002 | Yoon |
| 2003/0079107 A1 | 4/2003 | Booth et al. |
| 2003/0225768 A1 | 12/2003 | Chaudhuri |
| 2004/0010776 A1 | 1/2004 | Shah |
| 2004/0088578 A1 | 5/2004 | Chao et al. |
| 2004/0186836 A1 | 9/2004 | Schlesinger |
| 2004/0193594 A1* | 9/2004 | Moore et al. ............... 707/4 |
| 2004/0193912 A1 | 9/2004 | Li et al. |
| 2005/0044089 A1 | 2/2005 | Wu |
| 2005/0050053 A1 | 3/2005 | Thompson |
| 2005/0050084 A1 | 3/2005 | Atm |
| 2005/0114784 A1* | 5/2005 | Spring et al. ............... 715/762 |
| 2005/0195660 A1* | 9/2005 | Kavuri et al. ............ 365/189.05 |
| 2005/0226059 A1* | 10/2005 | Kavuri et al. ............ 365/189.05 |
| 2006/0026168 A1 | 2/2006 | Bosworth |
| 2006/0041661 A1 | 2/2006 | Erikson |
| 2006/0112129 A1 | 5/2006 | Kostojohn et al. |
| 2006/0206449 A1* | 9/2006 | Fletcher et al. ............... 707/1 |
| 2007/0055680 A1* | 3/2007 | Statchuk ............... 707/100 |
| 2007/0073673 A1 | 3/2007 | McVeigh et al. |
| 2007/0073776 A1* | 3/2007 | Kalalian et al. ............ 707/104.1 |
| 2007/0094300 A1* | 4/2007 | Abnous et al. ............ 707/103 R |
| 2007/0156687 A1 | 7/2007 | Idicula et al. |
| 2007/0203925 A1 | 8/2007 | Sandler |
| 2007/0208744 A1 | 9/2007 | Krishnaprasad et al. |
| 2007/0255677 A1* | 11/2007 | Alexander et al. ............... 707/1 |
| 2007/0276851 A1 | 11/2007 | Friedlander et al. |
| 2008/0098349 A1 | 4/2008 | Lin |
| 2008/0163332 A1 | 7/2008 | Hanson |
| 2008/0201330 A1 | 8/2008 | Bloesch |
| 2008/0201355 A1 | 8/2008 | Bloesch |
| 2008/0288510 A1 | 11/2008 | Bloesch |
| 2008/0320377 A1 | 12/2008 | Seetharamakrishnan et al. |
| 2009/0276834 A1 | 11/2009 | Bloesch |
| 2010/0325170 A1 | 12/2010 | Bloesch |

OTHER PUBLICATIONS

Using Multiple Representations Within a Viewpoint, Nigel James Stanger, Nov. 30, 1999 http://eprints.otago.ac.nz/26/01/Thesis.pdf (496 pages).

Tangsripairoj, Songsri, et al., "Organizing and Visualizing Software Repositories Using the Growing Hierarchical Self-Organizing Map", Journal of Information Science and Engineering 22, 283-295 (2006), Nov. 2005, pp. 283-295.

Rose, Thomas, et al., "Organizing Software Repositories Modeling Requirements and Implementation Experiences", 1992 IEEE, pp. 31-38.

Macchini, Bruno, Reusing Software with ESTRO (Evolving Software Repository), 1992 IEEE, pp. 150-157.

Petro, James, et al., "Model-Based Reuse Repositories—Concepts and Experience", 1995 IEEE, pp. 60-69.

Office Action dated Dec. 17, 2008 cited in U.S. Appl. No. 11/676,170.

Neil et al., "A Study of Usability of Web-Based Software Repositories" in: IEEE Software Methods and Tools 2000, Nov. 2000, pp. 51-58.

Edward Sciore, "Versioning and Configuration Management in an Object-Oriented Data Model," VLDB Journal, 3, 77-106, 1994, available at http://www.vldb.org/journal/VLDBJ3/P077.pdf.

Branko Milosavljevic, Milan Vidakovic, Srdjan Komazec and Gordana Milosavljevic, Faculty of Engineering, University of Novi Sad, Yugoslavia "User Interface Code Generation for EJB-Based Data Models Using Intermediate Form Representations," [online] Copyright 2003, PPPJ Jun. 16-18, 2003, Kilkenny City, Ireland, [retrieved on Dec. 4, 2006], pp. 125-128. Retrieved from the Internet: http://delivery.acm.org/10.1145/960000/957327/p125-milosavljevic.pdf?key1=957327&key2=4411925611
&coll=GUIDE&dl=GUIDE&CFID=75919783
&CFTOKEN=92791909.

Neel Sundaresan and Reshad Moussa, NehaNet Corp., San Jose, California, "Algorithms and Programming Models for Efficient Representation of XML for Internet Applications," [online] WWW10, May 1-5, 2001, [retrieved on Dec. 4, 2006], pp. 366-375. Retrieved from the Internet: http://delivery.acm.org/10.1145/380000/372090/p366-sundaresan.pdf?key1=372090&key2=4204925611
&coll=ACM&dl=ACM&CFID=75919783
&CFTOKEN=92791909.

Aske Simon Christensen, Anders Moller and Michael I. Schwartzbach, University of Aarhus, Denmark, "Extending Java for High-Level Web Service Construction," [online] ACM Transactions on Programming Languages and Systems, vol. 25, No. 6, Nov. 2003, [retrieved on Dec. 4, 2006], pp. 814-875. Retrieved from the Internet: http://delivery.acm.org/10.1145/950000/945890/p814-s_christensen.pdf?key1=945890&key2=3681925611&coll=ACM
&dl=ACM&CFID=75919783&CFTOKEN=92791909.

Weinberger, Ellis, et al., "A security policy for a digital repository", Oct. 2002, 5 pages.

Bustamente, Michele Leroux, "Building a Claims-Based Security Model in WCF", The ServerSide .NET Your Enterprise .NET Community, Mar. 28, 2007, 10 pages.

Worboys, Geoff, et al., "Firebird File and Metadata Security", Dec. 7, 2005, Document version 0.5, 12 pages.

Venkatrao, SQL/CLI A New Binding Style for SQL, SIGMOD Record, vol. 24, No. 4, Dec. 1995, pp. 72-77.

Office Action dated Jul. 21, 2009 cited in U.S. Appl. No. 11/676,170.

Office Action dated Aug. 19, 2009 cited in U.S. Appl. No. 11/749,607.

Andre Van Der Hoek, et al., "A Generic, Peer-to-Peer Repository for Distributed Configuration Management" Proceedings of ICSE-18, 1996 IEEE, pp. 308-317.

Philip A. Bernstein, et al., "Microsoft Repository Version 2 and the Open Information Model" Information Systems 22, 4, 1999, published by Pergamon Press, 27 pages.

Pierre-Alain Muller et al., "On Executable Meta-Languages applied to Model Transformations", In online Proceedings of Model Transformations in Practice Workshop, 2005, pp. 1-48.

A. Finkelsetin, et al., "Viewpoints: A Framework for Integrating Multiple Perspectives in System Development", International Journal of Software Engineering and Knowledge Engineering, Mar. 1992, World Scientific Publishing Co., 27 pages.

Microsoft SOA & Business Process, "Oslo", Oct. 2007, Microsoft Corporation, 1 page.

MSDN, "Oslo" Repository Architecture, Microsoft Corporation, 2009, 23 pages.

Anthony C. Bloesch, "Partitioning Modeling Platform Data", U.S. Appl. No. 12/489,245, filed Jun. 22, 2009, 32 pages.

Schechtman, Cheryl Maria, Untitled Office Action (from U.S. Appl. No. 11/749,616), Nov. 16, 2009, pp. 2-13, United States Patent and Trademark Office, Alexandria, Virginia.

Schechtman, Cheryl Maria, Untitled Office Action (from U.S. Appl. No. 11/749,616), May 6, 2010, pp. 2-11, United States Patent and Trademark Office, Alexandria, Virginia.

Phillips III, Albert M., Untitled Office Action (from U.S. Appl. No. 11/749,607), Mar. 9, 2010, pp. 2-11, United States Patent and Trademark Office, Alexandria, Virginia.

Phillips III, Albert M., Notice of Allowance and Fee(s) Due (from U.S. Appl. No. 11/749,607), Aug. 30, 2010, pp. 1-7, United States Patent and Trademark Office, Alexandria, Virginia.

Ort, Ed and Mehta, Bhakti, Java Architecture for XML Binding (JAXB), Mar. 2003, pp. 1-12, Sun Microsystems, Inc., published at: http://java.sun.com/developer/technicalArticles/WebServices/jaxb/.

McCluskey, Glen, Using Java Relection, Jan. 1998, pp. 1-8, Sun Microsystems, Inc., published at: http://java.sun.com/developer/technicalArticles/ALT/Reflection/.

Haggar, Peter, Java bytecode: Understanding bytecode makes you a better programmer, Jul. 1, 2001, pp. 1-9, IBM, published at: http://www.ibm.com/developerworks/ibm/library/it-haggar_bytecode/.

What's on the CD? O'Reilly VB.NET Core Classes in a Nutshell for Visual Studio .NET. Version 1.0, 2002, pp. 1-6, O'Reilly & Associates, Inc., published at: http://examples.oreilly.com/vbdotnetcore/.

U.S. Appl. No. 13/287,421, filed Nov. 2, 2011, Bloesch.

U.S. Appl. No. 11/749,616, mailed Feb. 4, 2011, Office Action.

Ort and Bhakti, Java Architecture for XML Binding (JAXB), Mar. 2003, http://java.sun.com/developer/technicalArticles/WebServices/jaxb pp. 1-12.

McCluskey, Using Java Reflection, Jan. 1998, http://java.sun.com/developer/technicalArticles/ALT/Reflection pp. 1-8.

Haggar, Java Bytecode: Understanding bytecode makes you a better programmer, Jul. 1, http://www.ibm.com/developerworks/ibm/library/it-haggar_bytecode/ 2001, pp. 1-9.

U.S. Appl. No. 12/112,773, mailed May 10, 2011, Office Action.

U.S. Appl. No. 11/749,616, mailed Nov. 16, 2009, Office Action.

U.S. Appl. No. 11/749,607, mailed Mar. 9, 2010, Office Action.

U.S. Appl. No. 11/749,616, mailed May 6, 2010, Office Action.

"What's on the CD?", O'Reilly VB .NET Core Classes in a Nutshell for Visual Studio .NET version 1.0, 2002, pp. 1-6.

U.S. Appl. No. 11/749,607, mailed Aug. 30, 2010, Notice of Allowance.

Notice of Allowance dated Nov. 21, 2011 cited in U.S. Appl. No. 11/749,616.

U.S. Appl. No. 12/112,773, mailed Sep. 16, 2011, Notice of Allowance.

U.S. Appl. No. 12/489,245, mailed Sep. 29, 2011, Notice of Allowance.

\* cited by examiner

| Repository item | Item's moniker |
|---|---|
| Shapes.dll | [6af6f630-b318-4a2b-a085-432f112ab60d, 42] |
|   Types | [498582a0-1b7a-47b4-993f-35aeffae40ba, 42] |
|     *Conic*.Circle | [271f64d9-7bde-4091-990b-53f85934e820, 7] |
|     *Conic*.Ellipse | [271f64d9-7bde-4091-990b-53f85934e820, 8] |
|     *Polygon*.Pentagon | [271f64d9-7bde-4091-990b-53f85934e820, 13] |
|     *Polygon*.Rectangle | [271f64d9-7bde-4091-990b-53f85934e820, 12] |
|     *Polygon*.Triangle | [271f64d9-7bde-4091-990b-53f85934e820, 11] |
|   Namespaces | [69530713-bf95-4df4-9248-b321f24ba696, 42] |
|     *Conic* | [c18c3482-85b8-4a83-9be9-8929136402bd, 11] |
|       Circle | [271f64d9-7bde-4091-990b-53f85934e820, 7] |
|       Ellipse | [271f64d9-7bde-4091-990b-53f85934e820, 8] |
|     *Polygon* | [c18c3482-85b8-4a83-9be9-8929136402bd, 12] |
|       Pentagon | [271f64d9-7bde-4091-990b-53f85934e820, 13] |
|       Rectangle | [271f64d9-7bde-4091-990b-53f85934e820, 12] |

*FIG. 3*

USING VIRTUAL REPOSITORY ITEMS FOR CUSTOMIZED DISPLAY

BACKGROUND

Computers are used all over the world to perform a wide variety of tasks. Computers perform these tasks by executing software code. Software code is typically written by one or more software developers using some type of integrated development environment (IDE). In many cases, developers are given a set of design instructions, and, using a programming language, draft software code that will implement the functions described in the design specifications. Depending on the nature and scope of the design specifications (or any subsequent modifications thereto), the software program can be both large and complex.

Enterprise software programs, for example, may involve many hundreds or thousands of software files, each file designed to interact with other files within the program and externally with other software programs and/or operating systems. Often, supplemental programs or databases are used to organize, search and maintain the metadata which describes the program and its files. Program metadata consists of information such as the structure of program components, behavior of those components, and other characteristics useful for organization and control. File metadata consists of information such as the date the file was last modified, the size of the file, the file's relation to other files within the software program, and other characteristics useful for organization and control.

Software programs such as repositories typically display and store a software program's files and their corresponding metadata together using an entity-property-value approach (also called the universal schema approach). For example, a repository might list the files alphabetically with the metadata alongside, each portion of metadata corresponding to the appropriate file. In such an example, the repository would list the file (i.e. the entity), each file property's name and a value for the property. Related files would, for example, be shown as a list of related files headed by the kind of relationship (e.g. files related to the file by an automatic generation process). This common entity-property-value approach, however, is cumbersome and ill-suited to providing a customized, user-centric approach. As well as being displayed to the user in this way the metadata is also stored in the repository in an analogous way as a table of entities, a table of property-value pairs and a table of relationship-first entity-second entity triples.

Furthermore, current software repositories typically allow a user (e.g. a developer) to search and/or browse all of the files and their corresponding metadata in the software program. Such search features, however, are only useful to a limited extent and lack many significant features. For example, in practice, repositories contain a wide variety of metadata and, often, the best way to display this metadata will vary between different metadata representations. Current software repositories typically only allow one method of displaying software metadata (i.e. the entity-property-value approach). Furthermore, current software repository search techniques are unacceptably slow and inefficient.

BRIEF SUMMARY

Embodiments of the present invention are directed to providing repository item information from different perspectives using virtual repository items within a customizable presentation scheme. In one embodiment of this invention, a computer system performs a method for providing repository item information from different perspectives using virtual repository items within a customizable presentation scheme. A computer system accesses a user-defined presentation scheme that describes a manner in which repository items are to be presented. The computer system generates virtual repository items for actual repository items based on the user-defined presentation scheme. The virtual repository items are generated for presentation along with their actual repository items. The computer system maps the virtual repository items to different virtualized sets of repository items according to the user-defined presentation scheme. The virtualized sets comprise at least one of actual repository items and virtual repository items. The computer system presents the virtualized sets of repository items in different perspectives within the user-defined presentation scheme.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-cited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example presentation scheme for providing repository item information from different perspectives using virtual repository items within a customizable presentation scheme.

DETAILED DESCRIPTION

Figure 1:
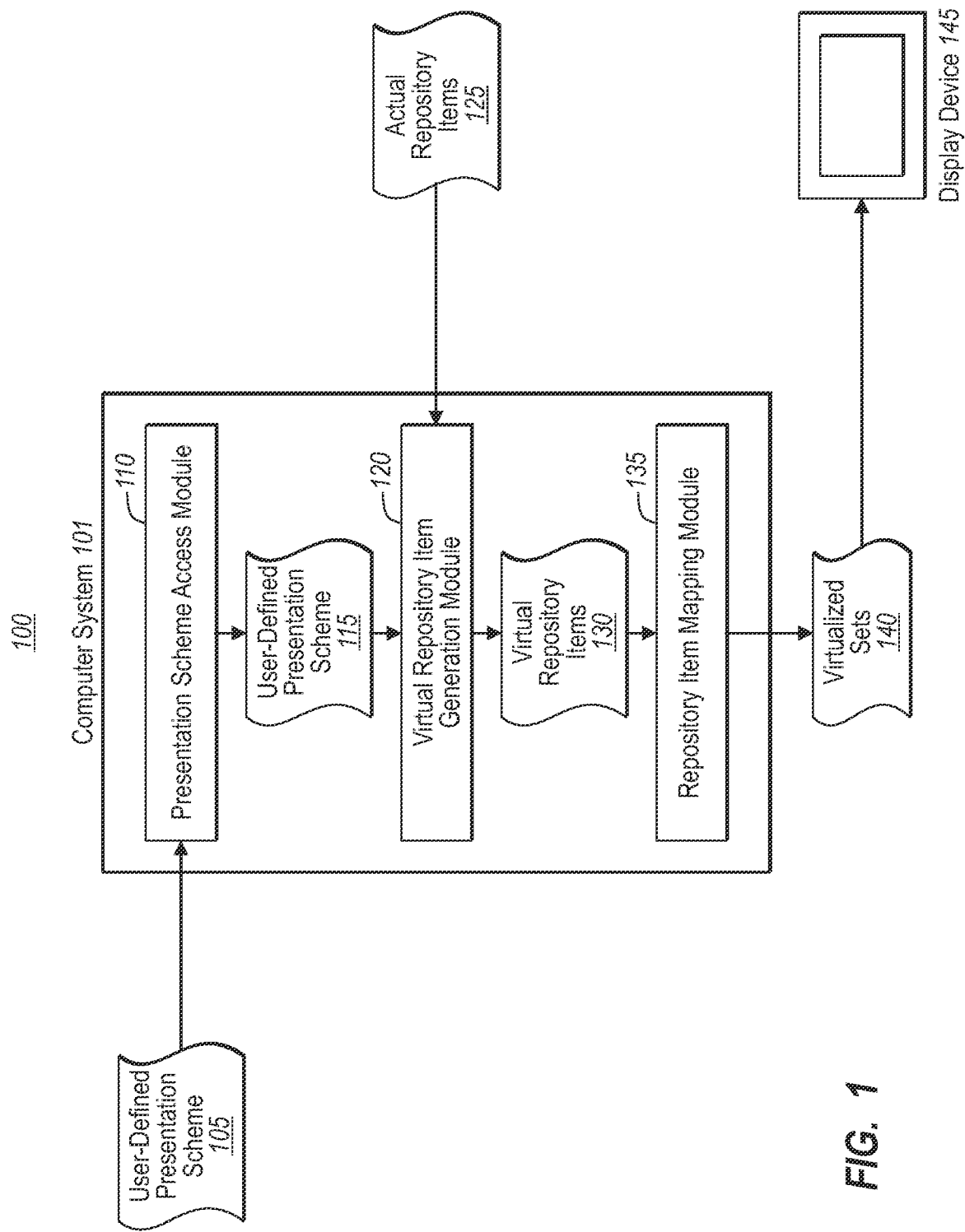
FIG. 1 illustrates a computer architecture in which embodiments of the present invention may operate including providing repository item information from different perspectives using virtual repository items within a customizable presentation scheme.

Embodiments are directed to providing repository item information from different perspectives using virtual repository items within a customizable presentation scheme. In one embodiment, a computer system performs a method for providing repository item information from different perspectives using virtual repository items within a customizable presentation scheme. Next, a computer system accesses a user-defined presentation scheme that describes a manner in which repository items are to be presented. The computer system generates virtual repository items for actual repository items based on the user-defined presentation scheme. The virtual repository items are generated for presentation along with their actual repository items. The computer system maps the virtual repository items to different virtualized sets of repository items according to the user-defined presentation scheme. The virtualized sets include actual repository items and virtual repository items. Next, the computer system presents the virtualized sets of repository items in different perspectives within the user-defined presentation scheme. The embodiments of the present invention may comprise a special purpose or general-purpose computer including various types of computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

FIG. 1 illustrates a computer architecture 100 in which the principles of the present invention may be employed. Computer architecture 100 includes computer system 101. In some embodiments, computer system 101 may be configured to receive user-defined presentation scheme 105. User-defined presentation scheme 105 as may be any type of structure or layout for presenting information. In some embodiments, the structure or layout of scheme 105 is defined by one or more users. In other embodiments, the structure or layout may be defined by a programmer or manufacturer of a software program that uses such presentation schemes. A "presentation scheme," as used herein, may describe any aspect of information layout or structure including where to display certain elements, how many to display, the order in which information elements should be displayed, placement of graphics (animated or static), text, headers, borders, embedded or otherwise incorporated media, or any other elements that can be presented to a user.

In some embodiments, user-defined presentation scheme 105 may be only partially customizable. For example, some elements of the presentation scheme 105 may be locked so as to be unavailable for changing. This may be beneficial for computer administrators who might want to ensure uniformity in the way certain information is presented to the users. In other embodiments, one or more of the layout or structural elements can be user-defined, up to and including all aspects of the presentation scheme.

Computers system 101 includes presentation scheme access module 110. In some embodiments, presentation scheme access module 110 may be used to access user-defined presentation scheme 105. For example, if a user defines and enters a user-defined presentation scheme 105 into computer system 101, presentation scheme access module 110 may be configured to receive and access the scheme 105. Furthermore, presentation scheme access module 110 may be configured to pass user-defined presentation scheme 115 to virtual repository item generation module 120. In some embodiments, user-defined presentation scheme 115 may be the same as user-defined presentation scheme 105, in which case scheme 105 is accessed by access module 110 and passed directly on to generation module 120. In other embodiments, presentation scheme access module 110 may access other user-defined presentation schemes that may have been stored on a hard drive or other storage medium and pass those accessed schemes on, represented in this example as user-defined presentation scheme 115.

Computer system 101 also includes virtual repository item generation module 120. In some embodiments, generation module 120 may be configured to receive user-defined presentation scheme 115 as well as actual repository items 125. A "repository," as used herein, may be any type of information store such as a database, directory, system registry, or other means of storing various types of information. Actual repository items 125 may include, but are not limited to metadata for program files, file references, namespaces, base classes, interfaces, program settings, registry settings, or any other information item that may be stored in a repository. Virtual repository item generation model 120 may be configured to generate a virtual repository item based on the received user-defined presentation scheme 115 and actual repository items 125, as will be discussed in greater detail below. Generated virtual repository items 130 may be sent to repository item mapping module 135.

In some embodiments, repository item mapping module 135 may be configured to receive virtual repository items 130 and map virtual repository items to different virtualized sets of repository items, as will be described in greater detail below. Mapping module 135 may send virtualized sets 140 to display device 145. In some embodiments, virtualized sets 140 may be sets of any types of information, paired or mapped by mapping module 135. For example, a virtualized set 140 may include an actual repository item and a virtual repository item. As one would appreciate, virtualized set 140 may include any combination of actual repository items and virtual repository items. Furthermore, virtualized sets may be customized according to user-defined presentation scheme 115. Display device 145 may be any type of device capable of displaying information. For example, devices capable of displaying text, graphics, motion pictures, or other types of information, including computer monitors, televisions, laptops, touch-screens or any other type of display come within the scope of display device 145.

Figure 2:
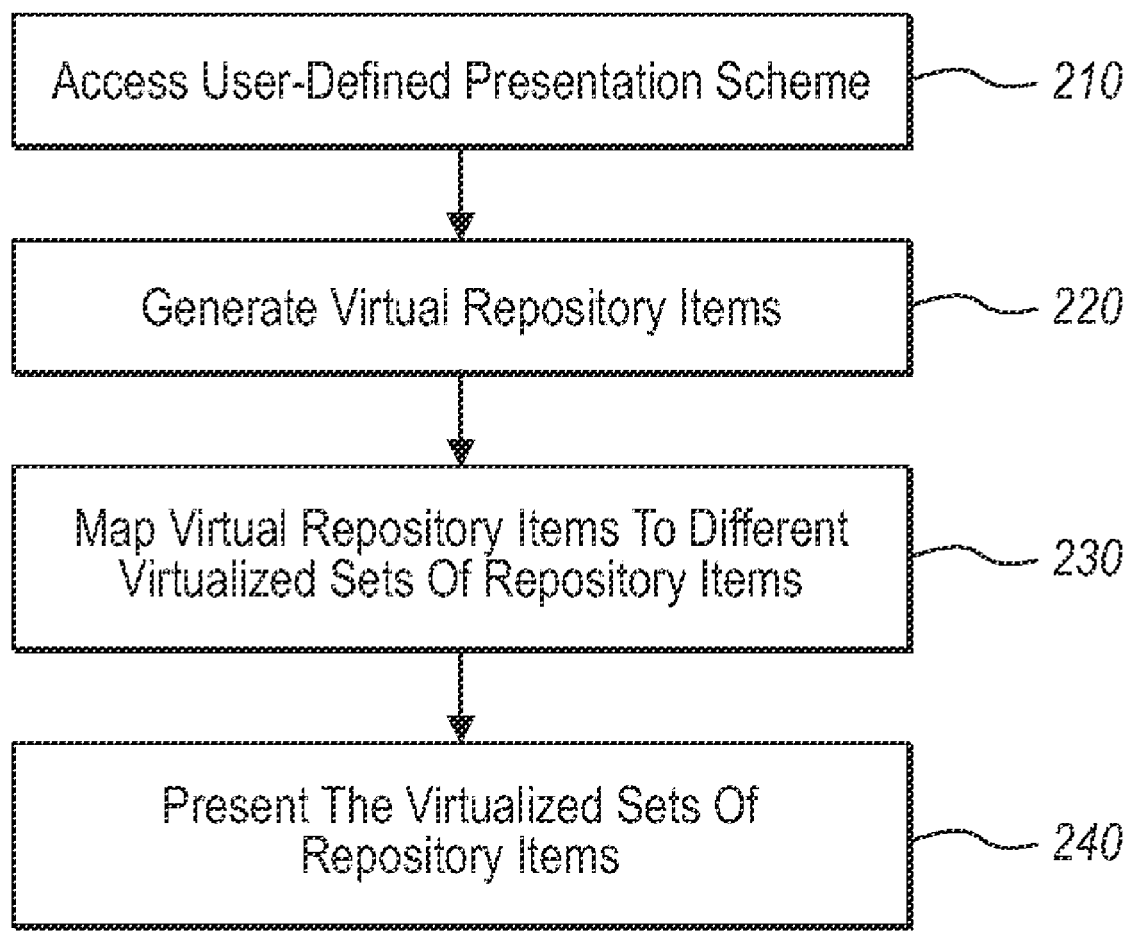
FIG. 2 illustrates a flowchart of an example method for providing repository item information from different perspectives using virtual repository items within a customizable presentation scheme.

FIG. 2 illustrates a flowchart of a method 200 for providing repository item information from one or more different perspectives using virtual repository items within a customizable presentation scheme. The method 200 will now be described with frequent reference to the components and data of environment 100 as well as exemplary presentation 300 of FIG. 3.

Method 200 includes an act of accessing a user-defined presentation scheme that describes a manner in which repository items are to be presented (act 210). For example, presentation scheme access module 110 may access user-defined presentation scheme 105 that describes a manner in which repository items are to be presented. In some embodiments, the user-defined presentation scheme uses monikers to refer to repository items and virtual repository items. As used herein, a "moniker" or "moniker family" can refer to any type of naming system or to a specific name. For example, a moniker that refers to a type of naming system may be a globally unique identifier (GUID). A moniker that refers to a specific name might be "Conic.Circle", as listed under "Types" 310 in FIG. 3.

Method 200 includes an act of generating virtual repository items for actual repository items based on the user-defined presentation scheme, wherein virtual repository items are generated for presentation along with their actual repository items (act 220). For example, virtual repository item generation module 120 may generate virtual repository items 130 for actual repository items 125 based on user-defined presentation scheme 105. Virtual repository items 130 may be generated for presentation along with actual repository items 125. In some embodiments, generating the virtual repository items 130 includes accessing an actual repository item 125 for use in generating the virtual repository item. For example, generation module 120 may access actual repository items 125 and determine which actual repository items are going to be displayed multiple times. For those actual repository items that are to be presented multiple times in the same presentation, generation module 120 may generate one or more virtual repository items corresponding to each actual repository item. This allows for the simultaneous display of actual repository items that otherwise would not be able to be displayed at the same time.

Method 200 includes an act of mapping the virtual repository items to different virtualized sets of repository items according to the user-defined presentation scheme, wherein the virtualized sets comprise at least one of actual repository items or virtual repository items (act 230). For example, repository item mapping module 135 may map virtual repository items 130 to different virtualized sets of repository items 140 according to user-defined presentation scheme 115. Virtualized sets 140 may include at least one of actual repository items 125 or virtual repository items 130.

In some embodiments, virtualized set 140 includes at least one of a plurality of actual repository items 125, a plurality of virtual repository items 130 or a combination of actual repository items 125 and virtual repository items 130. For example, virtualized set 140 may include three actual repository items 125 and five virtual repository items 130 (note that these numbers were chosen arbitrarily and that any combination of numbers could be used). In this example, the five virtual as repository items 130 may represent two virtual repository items for two of the actual repository items, and one virtual repository item for the remaining actual repository item. Thus, in such an example, one, two or all three actual repository items may be presented as well as any one or more of the five virtual repository items. Furthermore, any combination of actual and virtual repository items may be presented. Note also that virtual repository items may be presented without presenting the corresponding actual repository item.

In some embodiments, a browser may be used to view virtualized sets. A browser may be any type of metadata viewer such as a hierarchical tree based browser, or other means of browsing information. As explained above, a virtualized set may include any combination of virtual and actual repository items. Such browsers may be capable of presenting any number of actual repository items, virtual repository items, or virtualized sets. In some embodiments, user-defined presentation scheme 115 may be scalable to include any number of virtualized sets. These sets and repository items may be browseable and/or searchable, as will be explained in greater detail below.

Method 200 includes an act of presenting the virtualized sets of repository items in one or more different perspectives within the user-defined presentation scheme (act 240). For example, computer system 101 may present virtualized sets of repository items 140 in one or more different perspectives within user-defined presentation scheme 115. In some embodiments, a computer system user may be able to dynamically restructure the presentation of the virtualized sets based on a modification of user-defined presentation scheme 105.

For example, a user may wish to display repository items in column 305 including the types 310 and namespaces 315 of "Shapes.dll." If computer system 101 was previously configured to display the types 310 and namespaces 315 as a diagram, and the user wishes to display them as a categorized list, each item followed by its moniker 320, the user could specify such a display by modifying user-defined presentation scheme 105 and inputting the scheme 105 into computer system 101. Other presentation schemes may include formatted reports or formatted documents. Additionally or alternatively, as mentioned above, other presentation schemes may be stored on a hard drive or other storage medium accessible by computer system 101 and may similarly be modified to alter the presentation of virtualized sets 140.

In some embodiments, a user may desire to present virtualized sets 140 according to the namespace to which the actual repository item belongs. For example, if "Pentagon" and "Rectangle" belong to the namespace "Polygon" in FIG. 3, "Pentagon" and "Rectangle" can be presented as indented entries categorized under the namespace name "Polygon." In other embodiments, the virtualized set entries may be presented paired with the namespace. For example, "Polygon.Pentagon," "Polygon.Rectangle" and "Polygon.Triangle" may be presented as namespace-class name pairs under "Types" 310.

Computer system 101 may be used to efficiently search virtualized sets 140 by deferring the loading of providers and the execution of provider instructions until appropriate. "Providers," as used herein, include any type of application programming interface or other means whereby information is accessed, searched, loaded, saved or otherwise manipulated. In some cases, users may desire to browse and/or search repository information. Such browsing and searching may be efficiently performed by deferring the loading of providers until deemed appropriate by computer system 101.

By not loading at least some of the providers, less information will be as accessed at browser startup time, thus ensuring a quicker startup time. Similarly, once the provider has searched and located one or more repository items, computer system 101 may defer the execution of provider instructions until appropriate. For example, a browser's interface may have various buttons that allow access to different operations that may be performed using the retrieved repository information. Although the provider has retrieved information regarding the repository items and provided instructions on how the information is to be used, the execution of the instructions may be deferred until actuated by a user and/or until deemed appropriate by computer system 101.

In some embodiments, a repository information browser may include custom search panels. Such search panels may allow a user to specify various types of information that the browser and/or provider may use in searching repository information. For example, a search panel may allow searching based on accessibility, base classes, interface, namespace, size, modification date or other characteristics. Computer system 101 may also allow users to add various other characteristics to search by. In some embodiments, a user search queries actual repository item providers to determine which is able to display a selected moniker. For example, if a user had chosen a moniker of [271f64d9-7bde-4091-990b-53f85934e820, 13], Provider X may respond that it is capable of displaying all monikers that start with "271f64d9-7bde-4091-990b-53f85934e820." Thus, in this case, Provider X would be able to display all of the virtualized sets under "Types" 310 as each starts with "271f64d9-7bde-4091-990b-53f85934e820" and ends with a different number (e.g. "Polygon.Pentagon" ends with 13, "Polygon.Rectangle" ends with 12, and so on).

In such embodiments, multiple versions the same actual repository item may be simultaneously presented. For example, under item's moniker 320, notice that "Polygon.Rectangle" has the same GUID, followed by the same number (13) when listed under "Types" 310 as when listed under "Namespaces" 315. Thus, the "Rectangle" repository item may be presented in multiple ways at the same time as an actual repository item, a virtual repository item, or a combination of actual and virtual repository items mapped into virtualized sets and displayed on display 145.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, a method for providing repository item information from one or more different perspectives using virtual repository items within a customizable presentation scheme, the method comprising:
   an act of accessing one or more actual repository items from a repository;
   an act of accessing one or more user-defined presentation schemes that describe different manners in which repository items are to be presented;
   an act of generating virtual repository items for the one or more actual repository items based on the one or more user-defined presentation schemes, wherein a plurality of different virtual repository items are generated for some of the actual repository items in accordance with the one or more user-defined presentation schemes;
   an act of mapping the virtual repository items to one or more different virtualized sets of repository items according to the one or more user-defined presentation schemes, wherein the one or more different virtualized sets comprise at least one actual repository item and at least one virtual repository item; and
   an act of presenting the virtualized sets of repository items, presentation of the virtualized sets including simultaneously presenting a plurality of different presentation perspectives for one or more actual repository items based on the one or more user-defined presentation schemes, including simultaneously presenting multiple versions of at least one actual repository item, the multiple versions including:
      for each actual repository item, the actual repository item and one or more virtual repository items for the actual repository item.

2. The method of claim 1, wherein the one or more user-defined presentation schemes use monikers to refer to repository items and virtual repository items.

3. The method of claim 2, wherein the monikers are globally unique identifiers (GUID's).

4. The method of claim 1, wherein one of the presentation perspectives comprises a diagram.

5. The method of claim 1, wherein one of the presentation perspectives comprises a list.

6. The method of claim 1, further comprising allowing a user to dynamically restructure the presentation of the virtualized sets based on a modification of the one or more presentation schemes.

7. The method of claim 1, wherein the virtualized sets are presented according to the domain to which the actual repository item belongs.

8. The method of claim 1, wherein a browser is used to view virtualized sets.

9. The method of claim 1, wherein the one or more user-defined presentation schemes are scalable to include a plurality of virtualized sets.

10. The method of claim 1, further comprising efficiently searching the virtualized sets by deferring the loading of providers and the execution of provider instructions until appropriate.

11. The method as recited in claim 1, wherein each of the simultaneously presented multiple versions of the at least one actual repository item represent the at least one actual repository item in an different format arrangement for each different user-defined scheme.

12. A computer program product for use at a computer system, the computer program product for implementing a method for providing repository item information from one or more different perspectives using virtual repository items within a customizable presentation scheme, the the computer program product comprising one or more computer storage media having stored thereon computer-executable instructions that, when executed by a processor, cause the computing system to perform the method, including the following:
   access one or more actually repository items from a repository;
   access one or more user-defined presentation schemes that describe different manners in which repository items are to be presented;
   generate virtual repository items for the one or more actual repository items based on the one or more user-defined presentation schemes, wherein a plurality of different virtual repository items are generated for some of the actual repository items in accordance with the one or more user-defined presentation schemes;
   map the virtual repository items to different virtualized sets of repository items according to the one or more user-defined presentation schemes, wherein the one or more different virtualized sets comprise at least one actual repository item and at least one virtual repository item; and
   present the virtualized sets of repository items, presentation of the virtualized sets including simultaneously presenting a plurality of different presentation perspectives for one or more actual repository items based on the one or more user-defined presentation schemes, including simultaneously presenting multiple versions of at least one actual repository item, the multiple versions including:
      for each actual repository item, the actual repository item and one or more virtual repository items for the actual repository item.

13. The computer program product of claim 12, further comprising computer-executable instructions that, when executed, cause the computer system to present custom search panels.

14. The computer program product of claim 13, wherein the presented search panels provide for searching by one or more of accessibility, abstract class, interface or namespace.

15. The computer program product of claim 12, further comprising computer-executable instructions that, when executed, cause the computer system to allow a user to dynamically restructure the presentation of the virtualized sets based on a modification of the one or more presentation schemes.

16. The computer program product of claim 12, further comprising computer-executable instructions that, when executed, cause the computer system to efficiently search the virtualized sets by deferring the loading of providers and the execution of provider instructions until appropriate.

* * * * *